United States Patent
Greenwood et al.

[15] 3,651,711
[45] Mar. 28, 1972

[54] SHAFT ROTATING DEVICE

[72] Inventors: Marvin H. Greenwood; Lomis Slaughter, Jr.; George N. Polydoros, all of Houston, Tex.

[73] Assignee: Anderson, Greenwood & Co., Bellaire, Tex.

[22] Filed: Apr. 16, 1970

[21] Appl. No.: 29,081

[52] U.S. Cl................................................74/625, 251/164
[51] Int. Cl.............................................................F16h 35/00
[58] Field of Search..................74/625, 89.15, 424.8; 64/29; 251/164

[56] References Cited

UNITED STATES PATENTS

| | | | |
|---|---|---|---|
| 3,063,298 | 11/1962 | Elliott | 74/89.15 |
| 2,712,242 | 7/1955 | Davis | 251/164 |
| 3,305,058 | 2/1967 | Orwin et al. | 64/29 |
| 3,307,664 | 3/1967 | Halsall | 64/29 |

Primary Examiner—William F. O'Dea
Assistant Examiner—Wesley S. Ratliff, Jr.
Attorney—J. Vincent Martin, Joe E. Edwards and Jack R. Springgate

[57] ABSTRACT

A shaft rotating device suitable for rotating valve shafts which device includes an arm to be secured to the shaft, the arm defining a slot which diverges at its outer end, a screw driven nut having a projection engaging in the arm slot so that upon movement of the nut, the arm is rotated. The device includes a motor drive, a belt, a mechanical fuse clutch transmission, a tension adjustment for the belt, a clutching handwheel connected so that the handwheel may override the motor drive and stop switches in an explosion proof portion of the housing actuated from the oil bath portion of the housing in which the screw, nut and other elements are housed.

14 Claims, 12 Drawing Figures

GEORGE N. POLYDOROS
MARVIN H. GREENWOOD
LOMIS SLAUGHTER, JR.
INVENTORS.

GEORGE N. POLYDOROS
MARVIN H. GREENWOOD
LOMIS SLAUGHTER, JR.
INVENTORS.

BY J. Vincent Martin
Joe E. Edwards
Jack R. Springgate
ATTORNEYS

GEORGE N. POLYDOROS
MARVIN H. GREENWOOD
LOMIS SLAUGHTER, JR.
INVENTORS.

ATTORNEYS

GEORGE N. POLYDOROS
MARVIN H. GREENWOOD
LOMIS SLAUGHTER, JR.
INVENTORS.

BY
ATTORNEYS

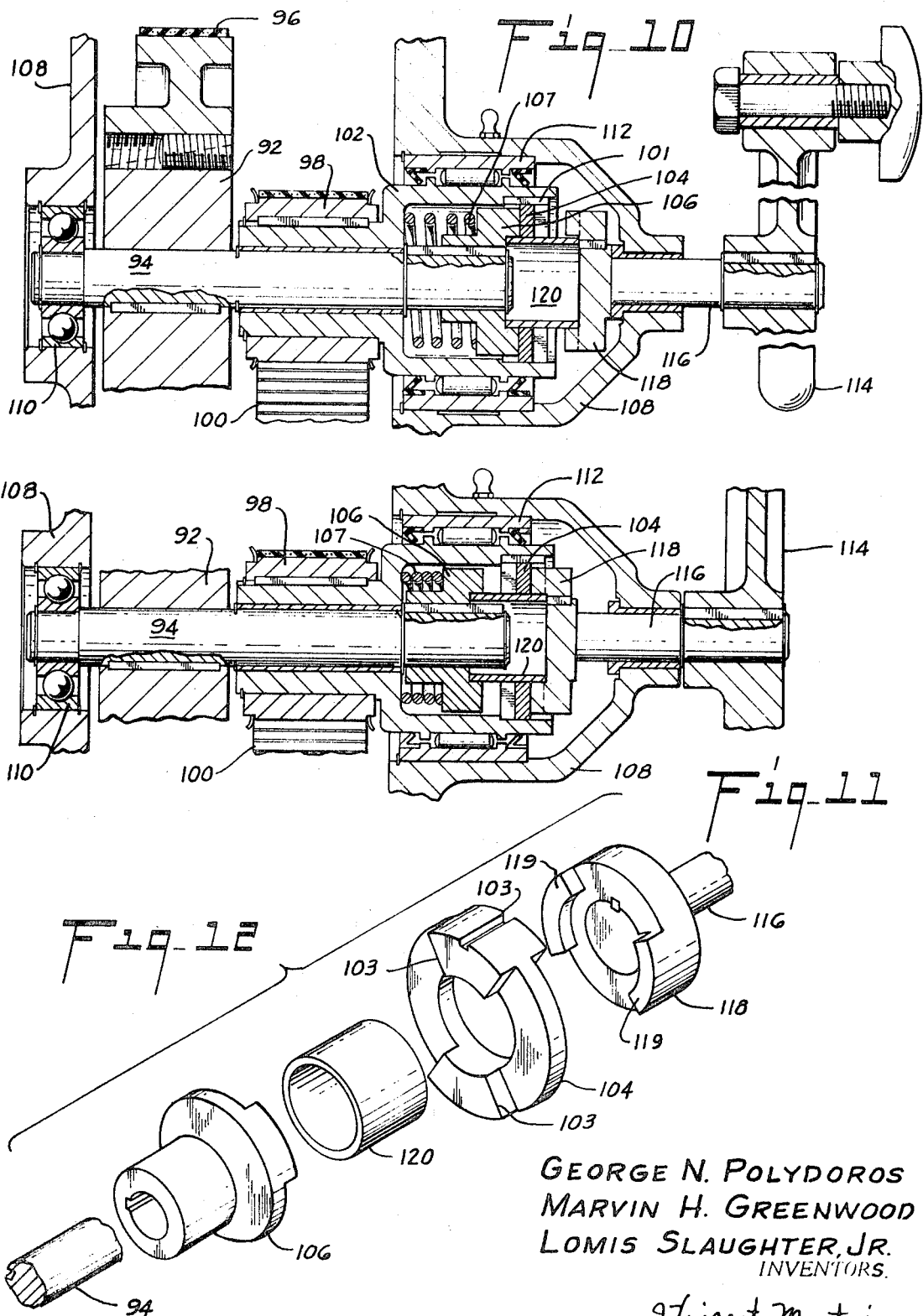

SHAFT ROTATING DEVICE

BACKGROUND OF THE INVENTION

Prior motor driven shaft rotating devices have had several disadvantages. Such devices have not been designed to avoid sideloads and side moments on the actuating screw and have thus had the highest friction loading and resistance to movement on the initial movement of the device from one of its extreme positions. Also, by failing to design to avoid sideloads and compression loads on the worm screw prior devices have had to employ large diameter screws to stand up under these loads. A large diameter screw is demonstratably less efficient than a smaller diameter screw of the same pitch since the thrust force is accompanied by a friction force which acts at a larger arm in the large diameter screw and thus requires a higher torque for a desired thrust.

Prior devices have employed a "scotch yoke" or drag link mechanism and have not obtained zero starting load on the driving motor and the high start and end phase mechanical advantage obtained in the present invention by the unique slotted cam. The starting advantage matches the requirements in most applications where the highest forces occur in starting a motion and relatively moderate forces can sustain the motion.

SUMMARY

The present invention relates to an improved motor driven shaft rotating device.

An object of the present invention is to provide an improved shaft rotating device having improved efficiency for rotating a shaft.

Another object is to provide an improved shaft rotating device with its own motor starting under zero load and capable of exerting high initial starting torques to start the actuated shaft rotating.

A further object is to provide an improved motor driven shaft rotating device having the feature of irreversibility and providing protection against extremely high loads.

Still a further object of the present invention is to provide an improved motor driven shaft rotating device which has a manual drive for rotating the shaft.

Still another object is to provide an improved transmission for a motor driven shaft rotating device having a minimum friction.

BRIEF DESCRIPTION OF THE DRAWINGS

These and other objects and advantages of the present invention are hereinafter set forth and explained with reference to the structure shown in the drawings wherein:

FIG. 10 is a sectional view of the declutching handwheel showing the motor drive in engagement.

FIG. 11 is a sectional view similar to FIG. 10 showing the handwheel drive in engagement.

FIG. 12 is an exploded perspective view showing the clutch dogs of the motor drive and handwheel drive.

DESCRIPTION OF THE PREFERRED EMBODIMENTS

The improved shaft rotating device 10 of the present invention is shown installed for rotation of the shaft of the valve V which may be any rotatable shaft valve such as a butterfly valve. The device 10 includes the motor 12, the transmission means and the connection to the shaft of the valve V. The motor 12 is contained within the housing 14, and is a reversible motor which rotates the shaft 16 in either direction depending on which direction the shaft of the valve V is to be rotated. The motor 12 is controlled by suitable switches controlling the electric power to the motor 12 which switches may be positioned at some remote location.

Figure 5:
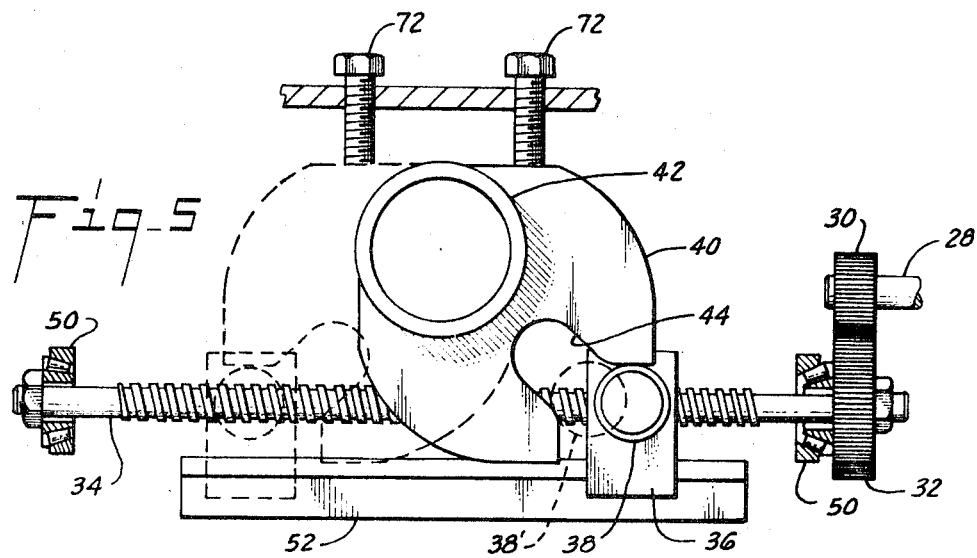
FIG. 5 is a partial plan view of the worm-trunnion nut drive mechanism.

The transmission means transmits rotation of motor 12 to the shaft of valve V. Shaft 16 extends through the housing 14 and the pinion 18 is mounted thereon. The timing belt 20 engages the pinion 18 and transmits rotation of the pinion to the gear 22 of the mechanical fuse clutch 24. A suitable belt tightening means 26 hereinafter described, is provided to maintain the desired tension in timing belt 20. The shaft 28 of clutch 24 extends through the tightening means 26 and has the pinion 30 mounted thereon, pinion 30 being in driving engagement with the gear 32 on the end of the worm 34. The worm 24 is a shaft having external threads, preferably Acme threads along substantial portions of its length as best shown in FIG. 5. The trunnion nut 36 rides upon and is driven by the worm 34. The trunnion nut 36 has the projections 38 in engagement with the arms 40 extending from the sleeve 42 which is suitably connected to the shaft of valve V so that rotation of the sleeve 42 rotates such shaft. The indicator 43 is connected to the shaft and is on the exterior of housing 14 to provide an indication of the position of valve V.

The worm 34, trunnion nut 36, the pinion 30, the gear 32, the sleeve 42 and the arms 40 are all contained within the oil bath portion of housing 14. The oil contained therein reduces the friction in these components. Dust cover 39 is secured to housing 14 by the fastener 41 to protect the externally exposed portion of the transmission system. From this description, it can be seen that rotation of the motor 12 drives the worm 34 through the timing belt 20, the fuse clutch 24, and the belt tightening means 26. Rotation of worm 34 moves the trunnion nut 36 axially of the worm 34 to rotate the sleeve 42 and the valve shaft.

The connection between the trunnion nut 36 and the arms 40 provides an improved operation in turning the shaft of valve V. The arms 40 define the slots 44 into which the projections 38 are adapted to engage. The slots 44 extend generally radially outward from the sleeve 42 and at their outer ends, the sides of slots 44 diverge or flare apart from each other to a position at which the sides of slots 44 are substantially perpendicular to each other. With slots 44 having this shape, the projections or followers 38 enter the open or divergent end of the slots 44 at each end of the travel of the trunnion nut 36 as shown in FIG. 5. Also with this slot configuration as the travel of the trunnion nut 36 starts, there is no engagement of the arms 40 so that this initial travel is free of any loading from the valve. When the followers 38 do engage in the slot 44 they initially engage the flared portion which is positioned substantially at a right angle to the path of travel of the followers 38 to cause the followers 38 to impact against the arms 40. This position of followers 38 is shown by the dashed line indicated 38' in FIG. 5. This impact is helpful in starting the rotation of the shaft of the valve V. One extreme position of nut 36 and arms 40 is shown in solid lines and the other is shown in dash lines.

As the worm 34 continues to rotate, the trunnion nut 36 continues to move axially thereof until the motor 12 is shut off or the nut 36 moves into engagement with one of arms 45 which engage one of the plungers 46 both of which extend from within the oil bath portion of housing 14 into the explosion proof portion of the housing 14. These plungers 46 engage the microswitches 48. The microswitches are connected to shut off the motor 12 only after sleeve 42 has rotated the valve 90° and the trunnion nut 36 has moved to the extreme of its movement. The arms 45 and microswitches 48 are positioned so that the motor 12 is shut off after the completion of rotation of the valve and when the trunnion nut 36 has moved into its free position so that when the motor 12 is started in the reverse direction it will be in a zero load condition.

Figure 2:
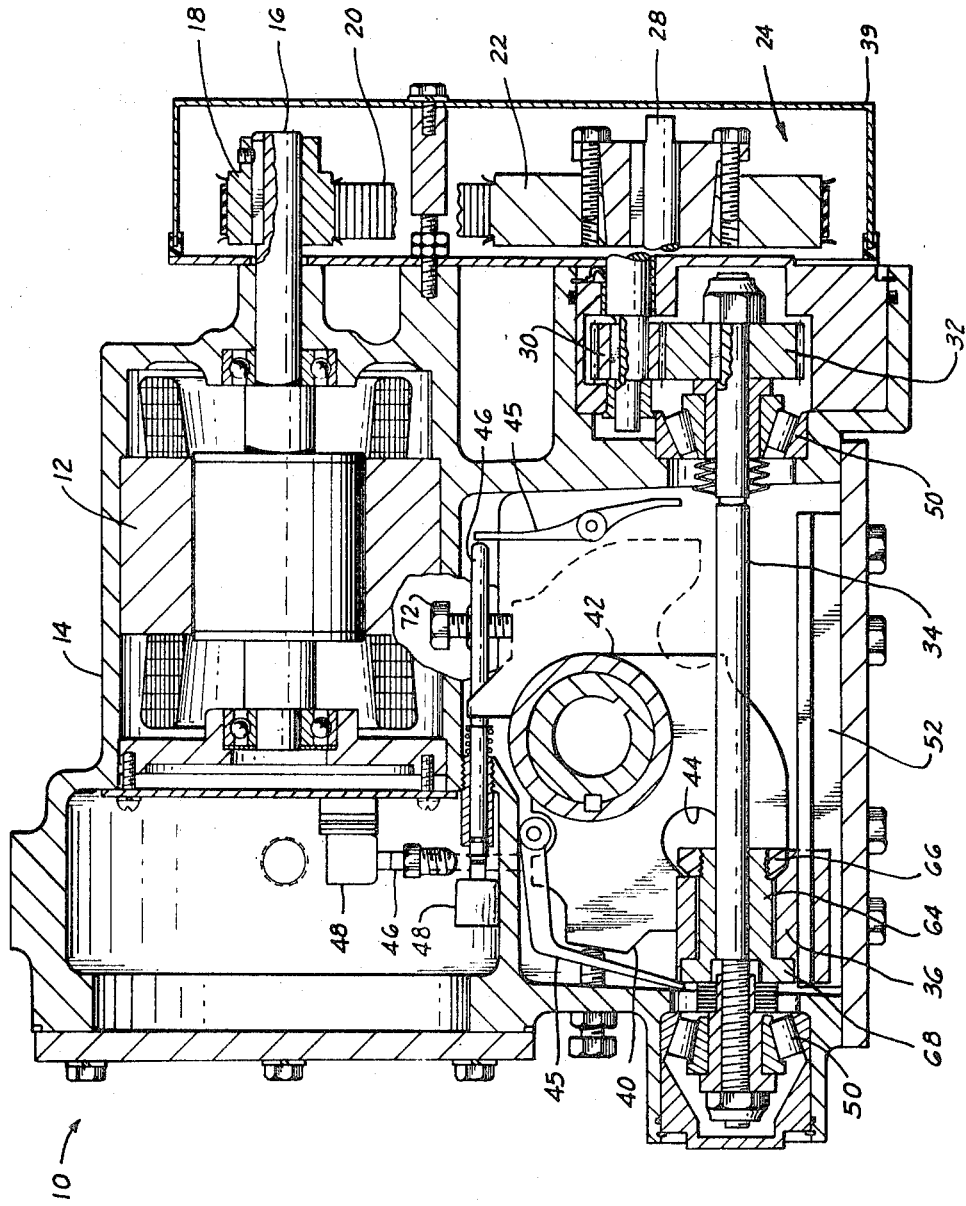
FIG. 2 is a sectional view of the device shown in FIG. 1 to show the transmission, the oil bath, the motor, and the explosion proof housing.
Figure 4:
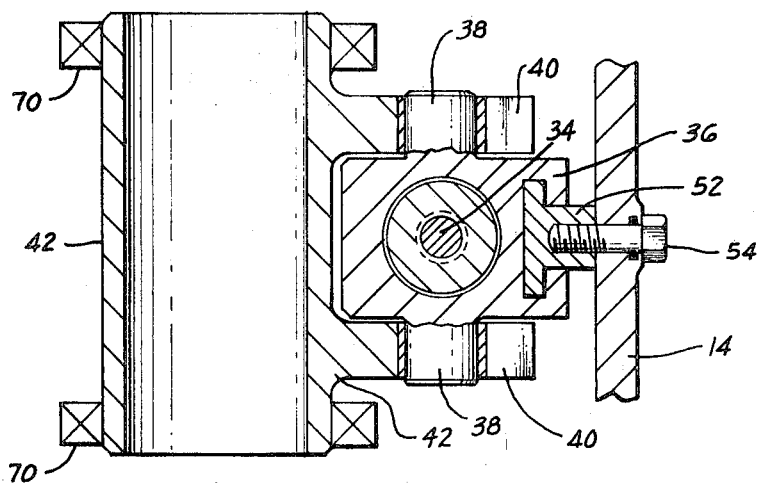
FIG. 4 is a sectional view of the drive mechanism taken along the axis of the shaft to be rotated.

The diameter of the worm 34 is small to have a minimum torque friction in driving nut 36. As can be seen in FIG. 2, the bearings 50 supporting the worm 34 are positioned so that the worm 34 is maintained in tension as it pulls the trunnion nut 36 across its travel path. The bearings 50 do not support any compressive loading of worm 34. The springs 51 surrounding worm shaft 34 at each end are provided to cushion the stopping of nut 36. By use of this type of bearings, the worm loading is never a compressive loading thus avoiding column compressive loads and allowing the use of the small diameter worm. To further minimize the worm loads, the trunnion nut 36 is guided by its engagement with the tee track 52 which is secured to the housing 14 by the bolts 54 as best seen in FIG. 4. This engagement with tee track 52 avoids side loads on the worm 34.

Figure 3:
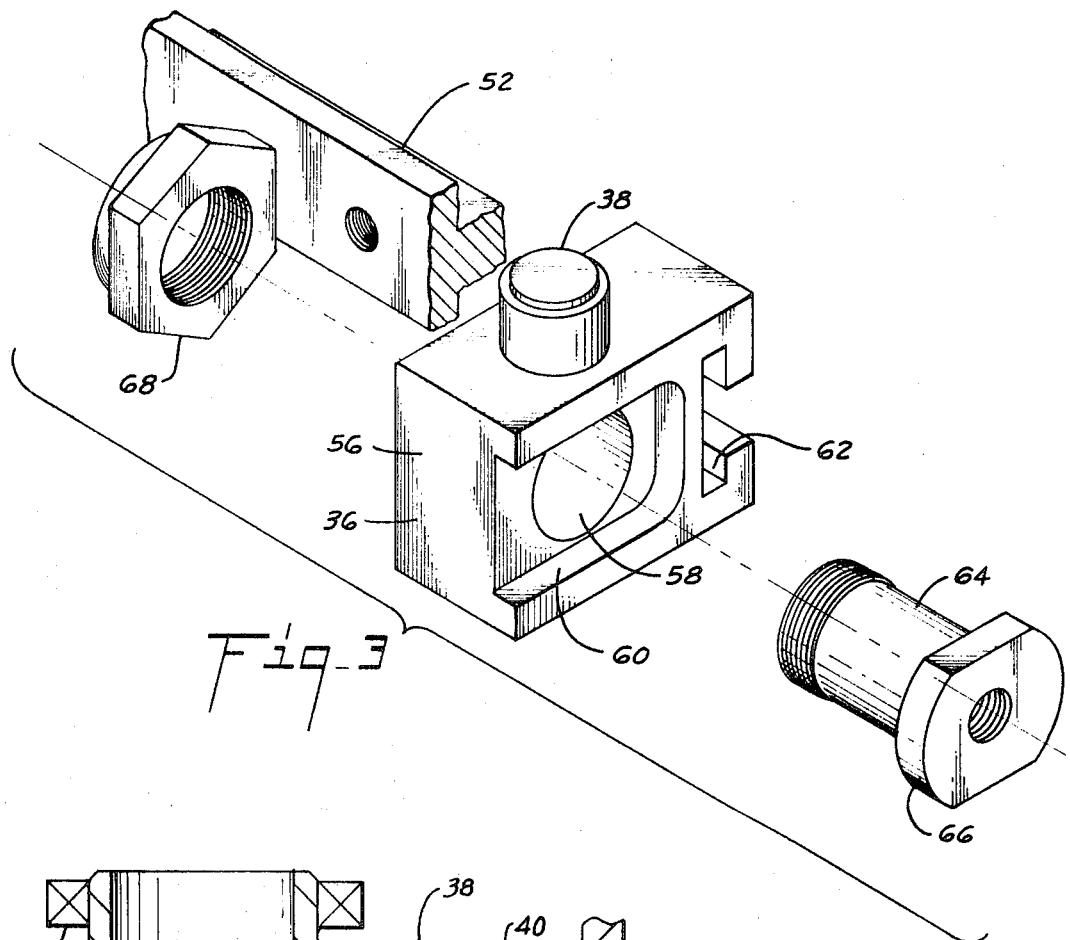
FIG. 3 is an exploded perspective view of the trunnion nut which is driven by a worm along the guide rail.

The trunnion nut 36 is best shown in FIG. 3 and includes the body 56 having a central bore 58, the recess 60 and the tee slot 62 through which the tee track 52 extends to guide the movement of the trunnion nut 36. The sleeve 64 is internally threaded for threaded engagement with worm 34, has the head 66 which engages within the recess 60 in body 56 when the sleeve extends through the bore 58 and has external threads on its other end to receive the nut 68 which secures the sleeve 64 in its position in body 56. Bore 58 has a diameter larger than the diameter of sleeve 64 by an amount sufficient to allow for the imperfection of manufacture and to prevent the transmission of lateral forces between these surfaces.

To further limit the friction loading, it is preferred that the engagement of the projections 38 of nut 36 in the slots 44 of the arms 40 be as free-moving as possible. For this reason, it is preferred that the projections 38 be rollers which are mounted to the body 56 by suitable bearings or low friction bushings. The sleeve 42 is provided with suitable bearings 70 schematically shown in FIG. 4 to further minimize the loading necessary for the device 10 to rotate the shaft of the valve V. The adjustable bolts 72 are mechanical stops to limit the movement of the arms 40. These stop bolts 72 are shown in FIG. 2 and also schematically in FIG. 5.

Figure 6:
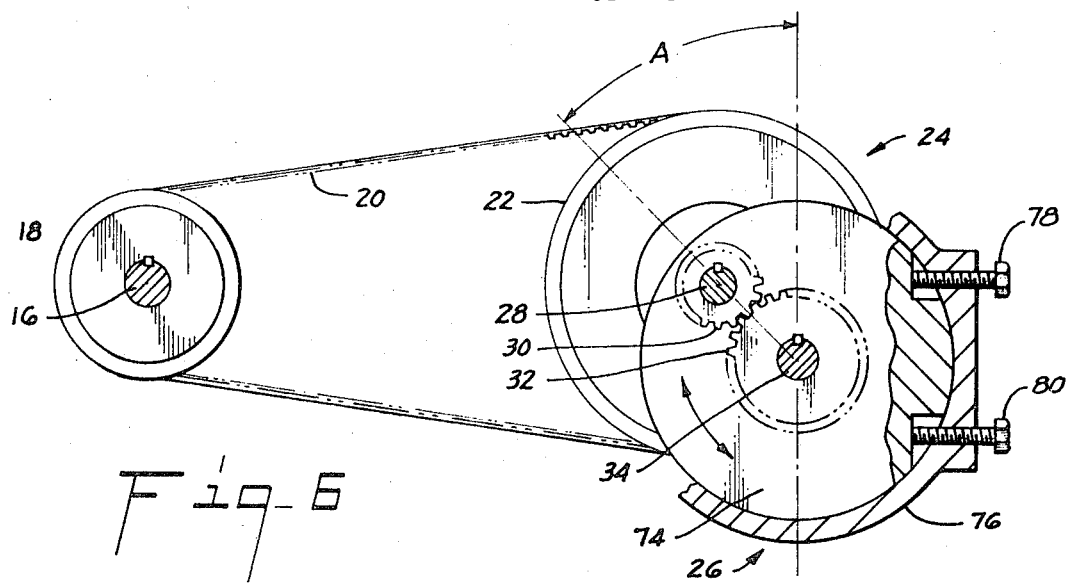
FIG. 6 is an elevation view of the belt transmission partly in section to show the adjustment feature of the drive belt.
Figure 7:
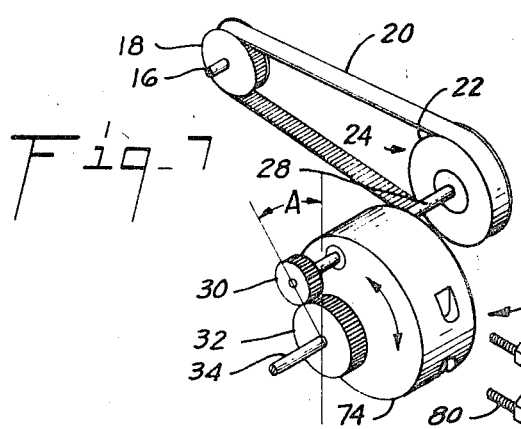
FIG. 7 is a perspective view illustrating the belt drive tension adjustment.

In order to assure that the driving of the sleeve 42 is as smooth as possible, it is preferred to maintain a preselected tension in the timing belt 20. For this purpose the belt tightening means 26 previously mentioned is provided. This means 26 including the disc 74 is rotatively mounted about the shaft 34 within the housing 76. Shaft 28 is journaled in disc 74. Rotation of disc 74 by the bolts 78 and 80 changes the angle A to control the tension of the belt 20. As can be seen from FIGS. 6 and 7, rotation of the disc clockwise decreases the angle A and increases the belt tension while counterclockwise rotation of the disc 74 increases the angle A to loosen the belt tension. This rotation of the disc 74 is readily accomplished by manipulation of the bolts 78 and 80. If bolt 78 is threaded inwardly and bolt 80 threaded outwardly, then the belt tension is loosened while if the reverse action of threading of bolts 78 and 80 is used, the belt tension is tightened.

Figure 8:
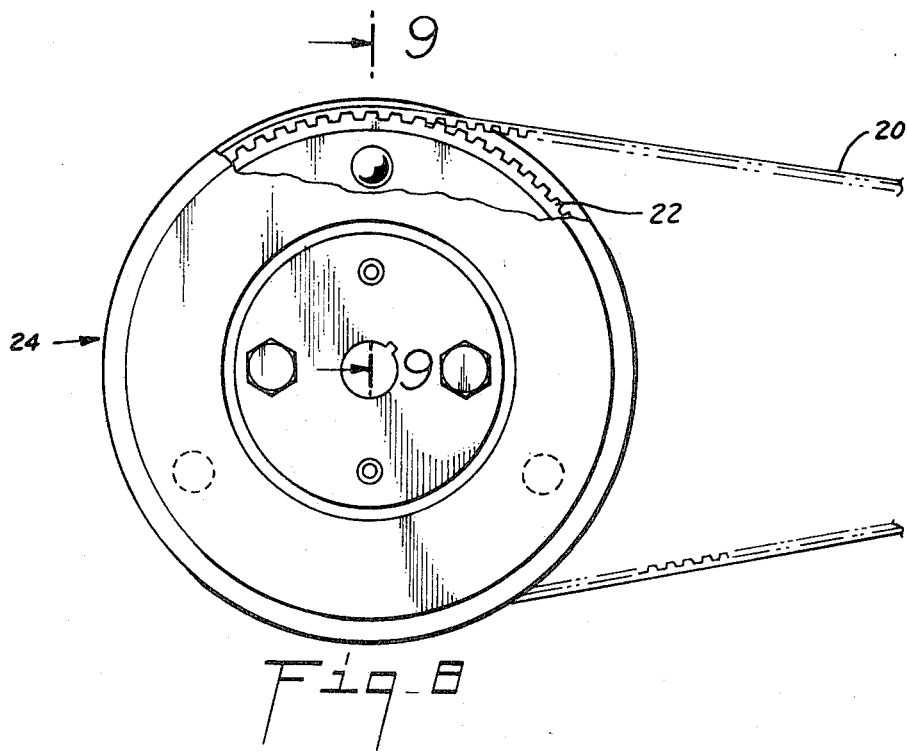
FIG. 8 is an elevation view, partly in section, of the mechanical fuse clutch.
Figure 9:
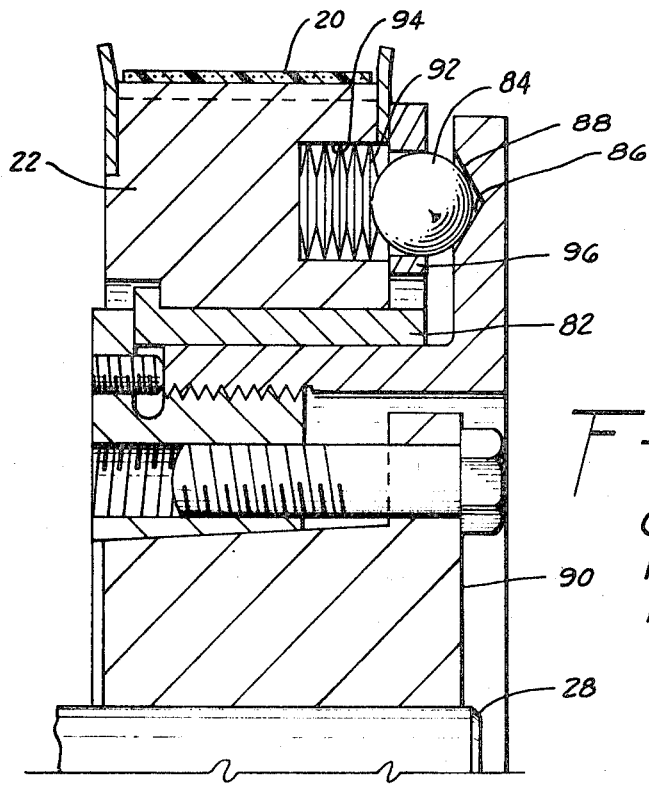
FIG. 9 is a sectional view of the clutch taken along line 9—9 in FIG. 8.

The mechanical fuse clutch 24 is best shown in FIGS. 8 and 9 and is provided to assure that when the valve shaft sticks or excessive resistance to rotation is developed, the power of motor 12 is not continually applied to the valve shaft. The belt 20 engages with the annular gear 22 which is rotationally mounted on the tubular bushing 82. Rotation of the gear 22 is transmitted to the shaft 28 through the engagement of the balls 84 in the recesses 86 in the outwardly extending flange 88 of the hub 90 which is mounted on the shaft 28. Bushing 82 is supported on hub 90 as shown. Springs 92 positioned in the recesses 94 in the gear 22 urge the balls 84 outwardly. The retainer ring 96 has tapered holes as best seen in FIG. 9 to allow free movement of balls 84 while limiting the outward movement of the balls. Whenever excessive resisting torque develops to the turning of the valve shaft, the shaft 28 slows in its rotation and the balls 84 are forced inwardly to disengage the driving connection between gear 22 and the shaft 28. With this mechanical type of overload clutch, once the driving connection of the balls 84 in the recesses 86 is released, the gear 22 may continue to rotate but shaft 28 stops thereby terminating the exertion of torque on the shaft of the valve V. Generally when clutch 24 has been disengaged, the driving connection is reset by stopping the motor 12 and rotating it slowly in the opposite direction.

It is generally preferred that the motor 12 be provided with a time delay shut off switch. The time delay of such switch is set to be longer than the normal time for a complete movement of trunnion nut 36 from one extreme position to the other extreme position. If the fuse clutch is disengaged responsive to excess load, then the motor 12 is shut down by the time delay switch as soon as the time period has expired. This time delay switch is reset automatically each time the motor 12 stops and restarts.

Figure 1:
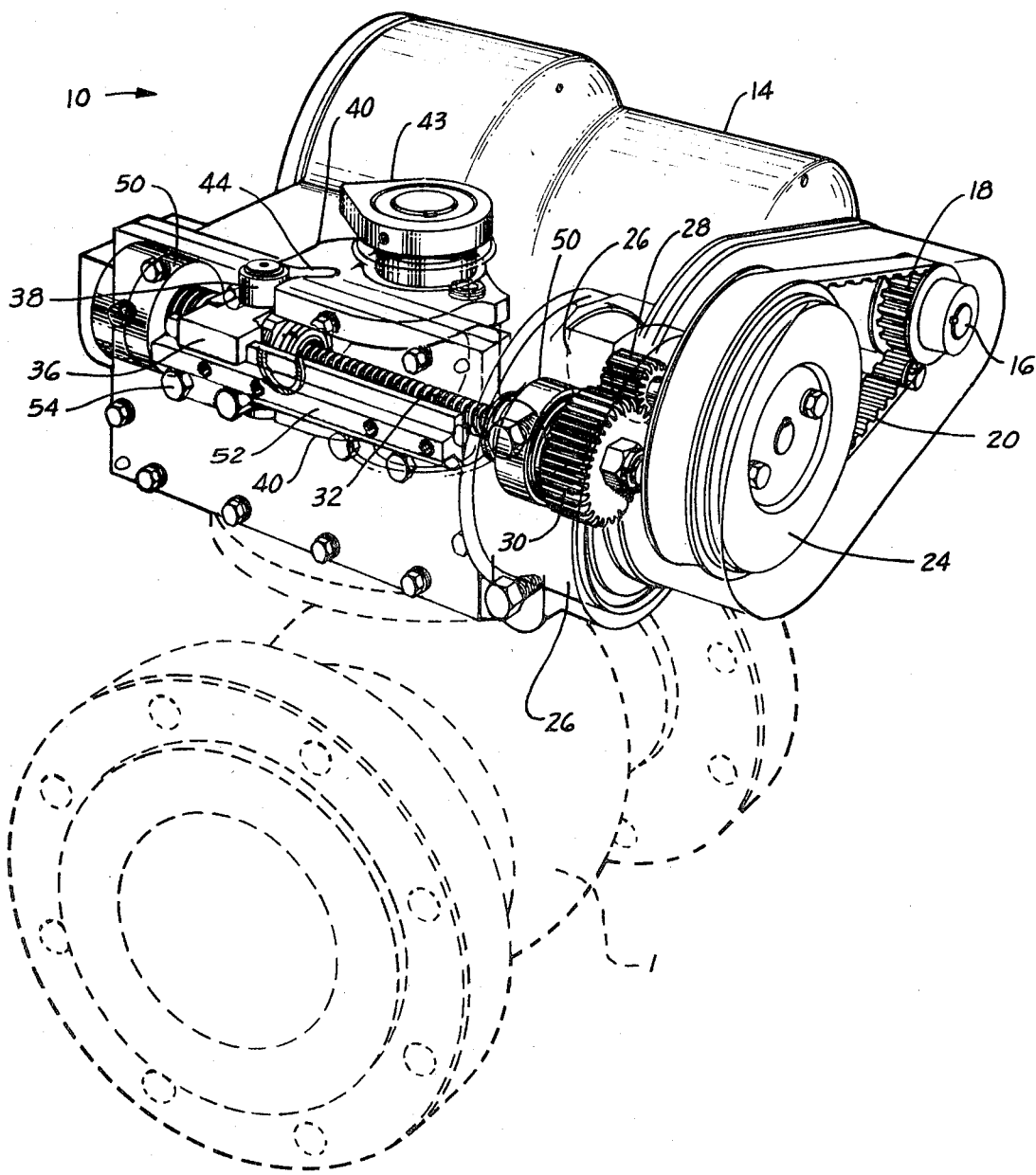
FIG. 1 is a perspective view, partly in phantom, of the preferred form of the improved shaft rotating device of the present invention installed upon a valve with the valve body being shown in dashed lines.

While not shown in the FIGS. 1 and 2, a modified form of shaft rotating device as shown in FIGS. 10, 11 and 12 includes a handwheel having a clutching device for disengaging from the motor before the handwheel is clutched into engagement with the transmission drive. The structure of the handwheel and its clutching device are shown in FIGS. 10, 11 and 12. The gear 92 which is secured to the shaft 94 is driven from the motor by the belt 96. The pinion 98 engages the timing belt 100 which drives the fuse clutch (not shown). The pinion 98 is keyed to rotate with the tubular bushing 102. The bushing 102 is mounted to rotate on shaft 94. The enlarged end of bushing 102 which functions as a clutch housing is secured by the key 101 to the dog 104. Lugs 103 extend from both sides of dog 104 as best seen in FIG. 12. Within the interior of the enlarged end of bushing 102 is the motor drive dog 106 having lugs 105. Dog 106 is keyed to shaft 94 and is spring biased toward engagement with the dog 104 by the spring 107. Shaft 94 and bushing 102 are journaled for rotation within the housing 108 by the bearings 110 and 112. The handwheel 114 is secured on shaft 116. Shaft 116 extends into housing 108 and is adapted to slide axially and rotate therein. The dog 118 having lugs 119 is secured to the inner end of shaft 116 and in the disengaged position, is spaced from engagement with the dog 104 by the sleeve 120. Sleeve 120 is slidably positioned in the interior of dog 104 and is maintained in contact with both dog 106 and dog 118 to hold dog 118 out of engagement with dog 104 until dog 106 has been retracted from engagement therewith. With sleeve 120 being sufficiently long, it is impossible for the motor drive to be placed in driving connection with the handwheel.

As shown in FIG. 10, the motor drive is engaged to rotate pinion 98 and transmit power by belt 100 and the transmission means to the worm 34 as previously explained. When it is desired that the handwheel be used, the handwheel 114 is pushed inward of housing 108 pushing sleeve 120 inward to disengage dog 106 from engagement with dog 104 by compressing the spring 107 and thereafter dog 118 moves into engagement with the dog 104 so that rotation of the handwheel 114 drives the pinion 98 and the transmission means as hereinbefore described.

The operation of the device 10 for rotating the shaft of valve V starts with the motor 12 driving the transmission means to rotate worm 34. By its threaded engagement with worm 34, trunnion nut 36 is pulled axially along worm 34. Side loadings on worm 34 are prevented by the sliding engagement of nut 36 on the guide track 52. Because of the engagement of the projections (rollers) 38 in the slots 44 of the arms 40, the sleeve 42 is rotated to thereby rotate the shaft of valve V. The indicator 43 shows the relative position of the valve shaft. At the end of its stroke the arm 40 engages one of the plungers 46 to cause the motor 12 to be shut off. Also the arm 40 engages one of the stops 72 to prevent further rotation of the valve shaft. Because of the switching arrangement, the trunnion nut 36 continues into its free position with projections 38 in the divergent portions of slots 44. When the motor 12 is restarted in the reverse direction, initial movement of nut 36 is free of arms 40 and therefore does not require a high starting torque. Also, the nut 36 is moving when its projections 38 engage on the side of the slot 44 which extends generally at right angles across the path of the nut 36. The moving engagement of projections 38 with arms 40 creates an initial impact turning of the shaft. This readily unseats the valve on the shaft and subsequent shaft rotation and driving of nut 36 is smooth and uniform.

From the foregoing it can be seen that the improved shaft rotating device of the present invention has greatly improved efficiency and is capable of exerting substantial forces upon starting rotation of the shaft from its extreme position. While the improved device has been shown installed on a valve to rotate the valve shaft, it may be used in any other shaft rotating application. The improved device of the present invention is provided with many desirable safety features such as the explosion proof chamber in the housing for containing the switches and other electrical motor controls.

What is claimed is:

1. A shaft rotating device comprising,
   a housing,
   an arm,
   means for securing said arm to extend at right angles to the shaft to be rotated within said housing,
   a worm rotatively mounted in said housing,
   a trunnion nut threadedly mounted for movement axially of said worm responsive to rotation of said worm,
   said trunnion nut having a bore and a sleeve threadedly engaged on said worm,
   means for preventing rotation of said sleeve,
   said sleeve being positioned within said bore and fitting loosely therein so that loads other than axial loads are not transmitted to said worm,
   a motor,
   transmission means connecting said motor to said worm for rotation of said worm, and
   means on said trunnion nut for engaging said arm whereby when said nut is moved axially of said worm, said arm and shaft are rotated,
   said arm engaging means having sufficient play therein at the end of the movement of said trunnion nut in one direction so that the initial movement of said nut in the opposite direction is independent of movement of said arm to engage said arm initially with an impact.

2. A shaft rotating device according to claim 1, wherein said transmission means includes an overload clutch which disengages the connection between said motor and said worm when the resistance to turning exceeds a predetermined amount.

3. A shaft rotating device according to claim 1, including, said worm, said trunnion and said arm being within a portion of said housing at least partially filled with oil,
   another portion of said housing being explosion proof,
   switch means within said explosion proof portion of said housing for stopping said motor, and
   means partially within said oil bath portion of said housing for actuating said switch means responsive to the completion of the desired rotation of the shaft being rotated.

4. A shaft rotating device according to claim 1, including,
   a handwheel, and
   clutching means connected to said handwheel,
   said clutching means being normally biased toward a position of driving connection from said motor to said worm and when actuated by said handwheel disengaging the connection to said motor and thereafter connecting said handwheel to said worm so that rotation of said handwheel provides a rotation of the shaft to which the device has been connected.

5. A shaft rotating device according to claim 1, wherein said transmission means includes,
   a pinion connected to said motor,
   a second shaft having a gear and a pinion mounted thereon,
   a gear on the shaft of said worm engaging the pinion on said second shaft,
   a timing belt engaging around said pinion connected to said motor and said gear on said second shaft, and
   means for adjusting the tension of said timing belt.

6. A shaft rotating device according to claim 1, wherein said worm shaft is mounted within said housing by bearings, said bearings being designed to support only tension in said worm shaft so that rotation of said worm pulls said trunnion nut along said worm shaft.

7. A shaft rotating device according to claim 1, including stop means for limiting the movement of said arm at each end of the travel of said trunnion nut.

8. A shaft rotating device according to claim 1, including a second arm being secured to extend at right angles to the shaft to be rotated and to coact with said other arm,
   said second arm having a slot therein similar to the slot in said first arm, and
   means on said trunnion nut engaging in the slot in said second arm whereby movement of said trunnion nut along said worm responsive to rotation thereof moves both of said arms and balances the load on said trunnion to maintain tension loads only on said worm.

9. A shaft rotating device according to claim 1, wherein said trunnion nut includes
   a body having a bore extending therethrough,
   a sleeve having a diameter less than the diameter of said body bore,
   means retaining said sleeve in position extending through said bore,
   said sleeve being internally threaded to receive said worm,
   a guide rail extending parallel to said worm,
   said body defining means for slidably engaging said guide rail whereby side loading of said worm is minimized.

10. A shaft rotating device according to claim 5, wherein said tension maintaining means includes,
    a disc rotatively mounted about the shaft of said worm,
    said second shaft being rotatively mounted in said disc at a position spaced radially from said worm shaft, and
    means for rotating said disc to change the position of said second shaft with respect to the motor pinion while maintaining the pinion on said second shaft in engagement with the gear on said worm shaft.

11. A shaft rotating device according to claim 3, wherein said switch actuating means includes
    a plunger extending from within said oil bath portion of said housing into said explosion proof portion of said housing,
    said plunger being positioned in said oil bath for engagement by said arm at the end of its movement in one direction whereby said switch is actuated when said arm reaches the end of its desired travel.

12. A shaft rotating device according to claim 6, wherein said worm shaft is a relatively small diameter to minimize the friction in driving said trunnion nut.

13. A shaft rotating device according to claim 11, including a second plunger extending from within said oil bath portion of said housing into said explosion proof portion of said housing, and
    a second switch in said explosion proof portion of said housing actuated by said second plunger,
    said second plunger being engaged by said arm at the opposite end of its travel from the end on which it engages the other plunger.

14. A shaft rotating device comprising,
    a housing,
    an arm,
    means for securing said arm to extend at right angles to the shaft to be rotated within said housing,
    a worm rotatively mounted in said housing,
    a trunnion nut threadedly mounted for movement axially of said worm responsive to rotation of said worm,
    a tee guide rail secured to said housing and extending along the path of travel of said trunnion nut, said trunnion nut slidably engaging said guide rail to prevent rotation of said nut with rotation of said worm and to maintain all movement of said nut axially of said worm, a motor, transmission means connecting said motor to said worm for rotation of said worm, and means on said trunnion nut for engaging said arm whereby when said nut is moved axially of said worm, said arm and shaft are rotated, said arm engaging means having sufficient play therein at the end of the movement of said trunnion nut in one direction so that the initial movement of said nut in the opposite direction is independent of movement of said arm to engage said arm initially with an impact.

* * * * *